United States Patent [19]

Sandiford

[11] 4,004,639
[45] Jan. 25, 1977

[54] SELECTIVELY PLUGGING THE MORE PERMEABLE STRATA OF A SUBTERRANEAN FORMATION

[75] Inventor: Burton B. Sandiford, Placentia, Calif.

[73] Assignee: Union Oil Company of California, Brea, Calif.

[22] Filed: Mar. 17, 1976

[21] Appl. No.: 667,693

[52] U.S. Cl. .............................. 166/292; 166/270
[51] Int. Cl.² ................ E21B 33/138; E21B 43/22
[58] Field of Search .......... 166/292, 270, 273, 281, 166/300; 61/36 B

[56] References Cited

UNITED STATES PATENTS

| | | | |
|---|---|---|---|
| 2,807,324 | 9/1957 | King et al. | 166/292 |
| 3,342,262 | 9/1967 | King et al. | 166/292 |
| 3,386,509 | 6/1968 | Froning | 166/292 |
| 3,396,790 | 8/1968 | Eaton | 166/270 |
| 3,530,937 | 9/1970 | Bernard | 166/270 |
| 3,741,307 | 6/1973 | Sandiford et al. | 166/292 X |
| 3,871,452 | 3/1975 | Sarem | 166/270 |
| 3,871,453 | 3/1975 | Sarem | 166/270 |
| 3,882,938 | 5/1975 | Bernard | 166/292 X |

*Primary Examiner*—Ernest R. Purser
*Assistant Examiner*—George A. Suchfield
*Attorney, Agent, or Firm*—Richard C. Hartman; Dean Sandford; Gerald L. Floyd

[57] ABSTRACT

A method for plugging the more permeable strata of a subterranean formation of nonuniform permeability in which an aqueous solution of a gelling agent and an aqueous solution containing both a gelling agent and an alkali metal silicate are injected into the formation. The two solutions can be injected in any order, and are separated by a slug of an inert aqueous spacer liquid. The first injected solution preferably also contains a polymer thickener.

15 Claims, No Drawings

SELECTIVELY PLUGGING THE MORE PERMEABLE STRATA OF A SUBTERRANEAN FORMATION

BACKGROUND OF THE INVENTION

1. Field of the Invention

This invention relates to the plugging of the more permeable strata of subterranean formations of nonuniform permeability. More particularly, the invention relates to an improved method for forming a plug covering a substantial areal extent of the more permeable strata. The method of this invention is especially useful in promoting more uniform fluid injection patterns, such as are desirable in the enhanced recovery of petroleum by displacement with flood water, and in achieving water shutoff in producing wells.

2. Description of the Prior Art

Since only a portion of the oil contained in a petroleum reservoir can be recovered by primary methods, it has become conventional practice to employ various enhanced recovery techniques to produce additional quantities of oil not economically recoverable by primary methods. Of the various enhanced recovery methods available, one of the most widely practiced techniques is the displacement of oil from the reservoir with a driving fluid such as flood water injected for that purpose. Normally, in carrying out the flooding process, a series of input wells spaced apart from one or more producing wells are drilled into and opened to the oil-producing strata. The injection well locations with reference to the production wells are selected to afford a desired flood pattern, the selected pattern depending in part upon field conditions, the location of existing wells, and the operator's preference. Aqueous drive fluid, such as water, brine, or a viscous aqueous polymer solution, is forced into the input wells under pressure, and out into the surrounding oil-bearing strata towards the producing well or wells. While waterflooding has been rather widely practiced in recent years, it is not without considerable operating problems and economic limitations, particularly those associated with low oil recoveries in proportion to the amount of water injected. Various surfactant and solvent floods have been proposed as means for recovering additional quantities of oil over that recoverable by conventional waterflooding. However, these processes face serious operating problems when practiced in heterogeneous formations containing strata or channels having permeabilities substantially higher than the bulk of the formation.

One of the major problems encountered in a flooding operation is breakthrough of the flooding medium from the flood front to the producing well relatively early in the displacement process, andd rapidly increasing producing water/oil ratios following the initial breakthrough. These difficulties result from the displacing medium channeling or fingering through the oil-bearing structure to the producing well, thus bypassing large zones of the oil-bearing strata. The reason for the channeling of the flooding medium to the producing wells and the resulting low oil recovery is due, in part, to the peculiar structure of the oil-bearing strata. Underground oil reservoirs, in most cases, consist of layers of sand or rock and, since no reservoir rock is perfectly uniform in composition and structure, the permeability will vary across the rock face or stratum. Also, fractures, cracks, vugs and other anomalies can promote channeling of the displacement fluid.

In the normal flooding operation, maximum oil recovery is obtained when the driven fluid builds up in a wide bank in front of the driving fluid which moves uniformly towards the producing well. To keep this bank of oil intact, and constantly moving towards the producing well, a substantially uniform permeability must exist throughout the strata. If this uniform permeability does not exist, or is not provided, the flooding fluid will seek the areas of high permeability, and channeling occurs with the consequent loss of some driving fluid energy and the appearance of excessive amounts of driving fluid in the producing well. Moreover, as the more permeable strata are depleted, the driving fluid has a tendency to follow channels and further increase consumption of the flooding media to the point where the process becomes uneconomical. This maximum limit, in terms of recovered oil, can be as high as 100 barrels of driving fluid per barrel of oil. It is of course desirable to operate at much lower driving fluid to oil ratios, and preferably not more than 15, and normally a maximum of 5 to 10 barrels of driving fluid per barrel of recovered oil is considered an acceptable operating condition, particularly where the driving fluid is a low cost agent such as flood water.

While a uniform flood front with reduced fingering can be obtained in some formations with a drive fluid rendered more viscous by the addition of various water-soluble polymers, or other materials capable of imparting higher viscosity to the flood water, viscous waterflooding is often ineffective in formations having severe heterogeneity as the mobility of the flood water cannot be economically reduced sufficiently to prevent or substantially restrict channeling of the flooding medium. Also, smaller volumes of aqueous polymer solution are sometimes injected into a heterogeneous reservoir to divert subsequently injected flooding media into the less permeable strata. However, such treatments are often ineffective or only partially effective in highly stratified formations. Hence, need exists for an improved flooding process for use in heterogeneous formations that will minimize channeling of the flooding medium or bypassing of large areas of the formation, or for a method for improving the effectiveness of the conventional selective plugging processes to obtain these goals.

Another problem associated with the production of oil from oil-bearing formations containing highly permeable water channels communicating the production well with a water zone is the intrusion of water into the well. Not only does this water intrusion cause production and disposal problems, but more importantly the beneficial effect of the natural water drive is at least in part lost thereby adversely affecting oil recovery. It is advantageous to at least partially plug the more permeable water channels so as to render the formation more uniformly permeable and to increase the sweep efficiency of the water drive, or alternatively to shut off the water intrusion. Heretofore, selective plugging of these water channels has presented great difficulty, it being necessary to effect at least a partial water plug without adversely affecting the permeability of the formation for oil production.

Thus, many processes have been proposed for plugging high permeability and/or water-producing zones wherein there is injected into formations containing such zones a wide variety of viscous solutions and/or plug-forming solutions. However, in many instances adequate plugging of such zones has not been achieved.

U.S. Pat. No. 3,386,509 to Froning describes a method for forming a plug at both ends of a high permeability zone between two wells wherein a sodium silicate solution is injected via one well and a gelling agent, such as carbon dioxide, is injected via the other well. The first-injected portion of the sodium silicate solution may contain little, if any, activator, such as ammonium sulfate or sodium bicarbonate. Thus, the first-injected portion forms a plug by reacting with the gelling agent with which it comes in contact in the formation. The later-injected portion contains sufficient activator to form a gel within a short time.

U.S. Pat. No. 3,396,790 to Eaton discloses a method for plugging a formation comprising: first injecting a slug of an aqueous solution containing a first reactive chemical, such as sodium silicate and a polymer or gum thickener; next injecting a slug of an inert spacer liquid; and finally injecting a slug of an aqueous solution of a second ractive chemical, such as ferrous sulfate.

U.S. Pat. No. 3,741,307 to Sandiford et al. shows a method for plugging the more permeable channels of a heterogeneous formation wherein there is injected into the formation: first a slug of a dilute aqueous solution of a water-soluble polymer thickener; and next a slug of a liquid agent that reacts in the formation to form a plugging material, such as an aqueous solution of sodium silicate, plus a gelling agent, such as ammonium sulfate, that causes a delayed gelling of the sodium silicate solution.

In spite of these and the many other known variations in methods of forming plugging precipitates in porous formations using alkali metal silicates, there remain problems in forming these plugs at the desired location in the formation. This is especially true where the nature of the formation is such that treating fluids injected through one well have only a relatively short residence time in the formation before being produced at an offset well.

Accordingly, a principal object of this invention is to provide a method for controlling the permeability of a subterranean formation of nonuniform permeability.

Another object of the invention is to provide a method for reducing channeling of a flooding medium from an injection well to a producing well via a high permeability channel.

Still another object of the invention is to provide a method for selectively plugging water-producing strata in a subterranean formation.

A further object of the invention is to provide a method for achieving a rapid set of a plug-forming solution following injection of the plug-forming solution into a formation.

A still further object of the invention is to provide a method for forming a plug over a large areal extent of the more permeable strata of a subterranean formation.

Other objects, advantages and features of the invention will become apparent from the following description and appended claims.

SUMMARY OF THE INVENTION

A method for at least partially plugging a relatively large areal extent of the more permeable zones, strata or channels in a subterranean formation of nonuniform permeability wherein there is injected into the formation via a well: (1) an aqueous reactive solution containing a relatively high concentration of a gelling agent for silicates, i.e., a gelling agent solution; and (2) an aqueous reactive solution containing a mixture of an alkali metal silicate and a relatively low concentration of a gelling agent therefor, i.e., a silicate-gelling agent solution. The two solutions can be injected in any order. It is preferred that the first-injected solution also contains a polymer thickener. It is also preferred that the two solutions be separated by injection of an inert aqueous spacer liquid.

A first silicate gel plug forms immediately when the two reactive agents contact each other. A further silicate gel plug forms at a later time in the silicate-gelling agent solution. As a consequence, a formation containing strata or zones of nonuniform permeability with respect to water is rendered more uniformly permeable. The permeability control technique of this invention is particularly useful in conjunction with a waterflood or steam drive, wherein the permeability adjusting treatment can be periodically performed as necessary to achieve the desired uniformity. In another embodiment of the invention, the aforementioned plugging solutions are injected into a producing well in order to plug permeable water channels in communication therewith.

DETAILED DESCRIPTION OF THE INVENTION

In the plugging of the more permeable strata of a heterogeneous subterranean formation according to the method of this invention, there is injected into the formation via a well penetrating the formation two fluid reactive compositions separated by an inert aqueous spacer liquid. One of the compositions will set after a period of time to form one plug. When the two fluid reactive compositions contact each other in the formation and mix, they set immediately to form another plug. Either of the two fluid reactive compositions can be injected first, followed by the inert spacer fluid and then the other reactive composition. It is preferred that the gelling agent solution be injected before the silicate-gelling agent solution.

One of the fluid reactive compositions is an aqueous solution containing a relatively high concentration of a gelling agent for silicates. The other fluid reactive composition is an aqueous solution containing both an alkali metal silicate and a relatively low concentration of a gelling agent therefor. Due to the relatively high concentration of gelling agent used in one of the fluid reactive compositions, a first plug, i.e., a solid precipitate or gel, forms as soon as the two fluid reactive compositions contact each other in the formation. Since the two injected fluids enter first the more permeable strata of the formation, the plug is formed in these more permeable strata.

When the first injected reactive solution is the gelling agent solution, the contact between the two reactive solutions generally occurs somewhere near the well, depending primarily on the size of the slug or inert aqueous spacer used between the slugs of the two reactive solutions. When this plug is formed, the remainder of the slug of the second injected reactive solution, i.e., the silicate-gelling agent solution, is forced into the next most permeable strata of the formation and on out into the formation away from the well. Since this aqueous solution contains both an alkali metal silicate and a low concentration of a gelling agent, after a time delay it will react to form a second plug even though it never contacts or mixes with the aqueous solution containing a relatively high concentration of gelling agent. The overall result is the formation of an extensive plug covering a relatively large areal extent in the formation comprising a first plug formed first near the well in the most permeable strata of the formation and a second plug formed later in the next most permeable strata.

When the first injected reactive solution is a silicate-gelling agent solution, the overall results are similar to those previously described, except that this first injected reactive solution penetrates more deeply into, and eventually sets in, the most permeable strata of the formation rather than being diverted into and setting in the next most permeable strata.

Sodium silicate is a preferred alkali metal silicate. Any sodium silicate having a ratio of silica to sodium oxide of from about 1.5:1 to about 4:1 by weight may be used. Preferably the ratio should be from about 3:1 to about 3.5:1. The concentration of alkali metal silicate in aqueous solution can range from between about 0.75 to about 25 percent by weight. However, weaker plugs are formed at the more dilute concentrations and costs are often excessive at higher concentrations. Preferably from between 2 to 15 percent by weight alkali metal silicate is employed.

The gelling agent for the alkali metal silicate can be an acid or an acid-forming compound, a water-soluble ammonium salt, a lower aliphatic aldehyde having from 1 to about 4 carbon atoms, an aluminum salt or an alkali metal aluminate. Exemplary gelling agents are sulfuric acid, hydrochloric acid, ammonium sulfate, formaldehyde, aluminum sulfate and sodium aluminate. The silicate reacts in the presence of the gelling agent to form a silica or silica alumina gel. It is well known that the gelling of sodium silicate is rapid in the presence of a relatively high concentration of a gelling agent. In the presence of a relatively low concentration of gelling agent, it is known that gelling of sodium silicate is delayed, i.e., occurs at some time after the silicate and the gelling agent are admixed. In using the silicate-gelling agent solution, it is preferred that the conditions be selected in accordance with known techniques to delay gelling of the sodium silicate for a period sufficient to permit its injection into the reservoir immediately adjacent the well, but yet not for a period that would unduly prevent continuance of normal well operations. Thus, in most cases, it is preferred that the conditions be selected so that gelling is delayed for about two hours and is subsequently completed within about 24 hours. The concentration of gelling agent employed in these so-called "time setting" aqueous compositions can vary over a wide range depending on such variables as the particular gelling agent used, the pH of the system and the gel time desired. In general, an aqueous solution containing from about 0.25 to about 0.75 part by weight gelling agent per each part by weight alkali metal silicate in the solution is satisfactory. preferably, about 0.5 part by weight gelling agent per part by weight alkali metal silicate is used.

The silicate-gelling agent solution can be prepared by mixing together the components in any desired order at the surface. Alternatively, there may be prepared at the surface one aqueous solution of an alkali metal silicate and another aqueous solution of a low concentration gelling agent. Either aqueous solution can contain a mobility-reducing polymer if desired. The two aqueous solutions are then injected down the well simultaneously, and mix during their passage down the well prior to entering the formation.

The separately injected gelling agent solution can employ from about 0.75 to about 1.4 parts by weight gelling agent per part by weight of alkali metal silicate present in the other reactive solution utilized. Preferably, from about 0.9 to about 1.25 parts by weight gelling agent is used in this separately injected aqueous solution per each part by weight of alkali metal silicate used in the other reactive solution. When this gelling agent solution and the silicate-gelling agent solution contact each other in the formation, gellation occurs immediately.

The volumes of the two fluid reactive compositions used in the method of this invention depend on a variety of factors such as the permeability and porosity of the formation being treated, the distance between wells, and the particular reactive materials employed. Generally, it has been found satisfactory to employ about 1 to about 100 barrels per vertical foot of formation to be treated of the gelling agent solution. Similarly, about 2 to about 200 barrels per vertical foot of formation to be treated of the silicate-gelling agent solution is employed. It is preferred to employ from about 2 to about 10 times the volume of the slicate-gelling agent solution as of the gelling agent solution.

The two reactive solutions are sequentially injected down the well and into the formation separated by a slug of an inert aqueous spacer liquid. Thus, mixing of the two reactive solutions during their passage down the well is minimized. However, as soon as the two reactive solutions enter the formation, it is desired that they no longer be separated but that they contact each other so that a first plug is formed. To improve the chance for contact in the formation, the reactive solution which is injected first, whichever of the two reactive solutions it may be, preferably contains a polymer thickener or a mobility reducing agent. The polymer thickener slows down the progress through the formation of the first injected reactive solution and allows the second injected reactive solution to overtake the first injected solution and contact it.

A number of water-soluble polymers are known to decrease the mobility of aqueous solutions in porous media when dissolved in the aqueous solutions in dilute concentrations. Exemplary water-soluble polymeric materials that can be used as thickeners are relatively high molecular weight acrylic acid-acrylamide copolymers, acrylic acid-acrylamide-diacetone acrylamide terpolymers, polyacrylamides, partially hydrolyzed polyacrylamides, cellulose derivatives such as hydroxyethylcellulose and carboxymethylcellulose, polyoxyethylenes, modified starches, heteropolysaccharides obtained by the fermentation of starch-derived sugar, polyvinyl alcohol, polyvinyl pyrollidone and polystyrene sulfonates.

Many of the water-soluble polymers useful in the practice of this invention are characterized by a viscosity of at least 3 centipoises for a 0.1 percent by weight solution thereof in aqueous 3 percent by weight sodium chloride solution at 25° C. as determined with a Brookfield viscosimeter equipped with a UL adapter and operated at a speed of 6 rpm. However, it is to be recognized that other of the water-soluble polymers, such as certain acrylamides and polyoxyethylenes, are effective in reducing the mobility of water in porous media, yet have little or only slight effect upon the viscosity of water.

A preferred water-soluble polymer useful as the mobility reducing agent in the first-stage injection is partially hydrolyzed polyacrylamide having between about 2 to about 67 percent of the carboxamide groups hydrolyzed to carboxyl groups, and which is characterized by a molecular weight of at least 500,000 and preferably 1,000,000 or more. Another preferred polymer having the desired viscosity increasing properties is acrylic acid-acrylamide copolymer of similar molecular weight. Still another preferred viscosity increasing agent is acrylic acid-acrylamide-diacetone acrylamide terpolymer.

The water-soluble polymers useful in this invention are inclusive of the polymers wherein the carboxyl groups are in the acid form and also such polymers wherein the carboxyl groups are in the salt form, provided that the salts are water-soluble. Thus, for example, the polymers can be employed in the form of the carboxylates of sodium, potassium, other alkali metal, or ammonium, or in the form of the mixed carboxylates of sodium, potassium, magnesium, calcium, and the like.

The selected water-soluble polymer is admixed with water or brine and the first-injected reactive material to provide a relatively dilute aqueous solution that exhibits a sufficiently reduced mobility when injected into the porous media to enable subsequently injected fluids to catch up with and contact the low mobility fluid. Preferably, the polymer is dissolved in fresh water since the mobility reduction effect of most of these polymers is inhibited by the presence of substantial quantities of dissolved salts. However, it is sometimes desirable to employ oil-field brine or other water containing relatively high dissolved salt contents, particularly where the formation into which they are to be injected is water-sensitive or where fresh water is not available. In most instances, the mobility of the water can be reduced to the desired level by the addition of about 0.001 to about 1 percent by weight of the polymer, and satisfactory results can often be obtained by the addition of 0.05 to 0.15 percent by weight polymer.

Low viscosity fluids used in the process of this invention have viscosities of about 1 centipoise. The polymer-thickened aqueous solution generally has a viscosity in the range of from about 5 to about 100 centipoises.

In order to decrease the amount of contact between the two reactive solutions during their passage down the well conduit, a slug of the inert aqueous spacer liquid is injected between the slugs of the reactant solution. Either fresh water or sodium chloride brine can be used as the spacer liquid. Generally from about 1 to about 100 barrels of spacer liquid per vertical foot of formation to be treated is used. A slug of from about 2 to about 50 barrels spacer liquid per vertical foot of formation to be treated is preferred.

Forming two plugs having the same composition in the formation according to the method of this invention has certain advantages over forming either plug alone. Forming one plug near the injection well and another plug farther out in the formation provides plugging material in a large areal extent of the formation. If only a single plug is formed by injecting a silicate-containing solution and a gelling agent-containing solution, the volume of the plug can be small. If only a single plug is formed by injecting a "time setting" solution containing both a silicate and a gelling agent, it is difficult to control the position of the plug due to the rapid movement of the solution through the formation and the slow rate of gellation. In treating some formations having limited distances between wells with time setting solutions, it has been the experience that some or all of the time setting solution is produced at an offset well before gellation occurs.

It is preferred that the well be shut-in for a few hours following placement of the treating solutions in the formation to allow the gel formed to increase in strength and form a better permeability-blocking material. In normal well operations a few hours to 24 hours or more are required following placement of the above-described treating solutions to get the well ready for the next operation, such as production or injection of a fluid for enhanced recovery. This normal shut-in time is usually sufficient for formation of a gel having adequate strength. If the desired degree of plugging is not achieved by one series of injections, it may be necessary to repeat the procedures one or more additional times.

The invention is further described by the following examples which are illustrative of specific modes of practicing the invention and are not intended as limiting the scope of the invention as defined by the appended claims.

EXAMPLES 1 – 17

A series of laboratory tests are made in which 50 ml. of an aqueous solution of sodium silicate are mixed with 50 ml. of an aqueous solution of various gelling agents. The time required for a gel to form is visually observed. The following table shows the results of these tests.

TABLE

| Example | Concentration of Sodium Silicate* in Aqueous Solution (percent by weight) | Concentration of Gelling Agent in Aqueous Solution (percent by weight) | | Time for Gel to Form (minutes) |
|---|---|---|---|---|
| 1 | 14 | 12 | hydrochloric acid | 180 |
| 2 | 13 | 6 | polyacrylic acid | immediate |
| 3 | '' | 3 | '' | immediate |
| 4 | 6 | 4 | ammonium sulfate | 5 |
| 5 | '' | 3.5 | '' | 45 |
| 6 | '' | 3.5 | ''** | 20 |
| 7 | '' | 3.2 | ammonium sulfate | 70 |
| 8 | '' | 3.2 | ''** | 50 |
| 9 | '' | 3.1 | ammonium sulfate | 122 |
| 10 | '' | 3.1 | ''** | 60 |
| 11 | 3 | 6 | ammonium carbonate | immediate |
| 12 | '' | 6 | ammonium bicarbonate | immediate |
| 13 | 13 | 37.5 | formaldehyde | 30 |
| 14 | '' | 30 | '' | 60 |
| 15 | 6 | 20 | '' | 90 |
| 16 | '' | 4 | aluminum sulfate | 10 |

TABLE -continued

| Example | Concentration of Sodium Silicate* in Aqueous Solution (percent by weight) | Concentration of Gelling Agent in Aqueous Solution (percent by weight) | Time for Gel to Form (minutes) |
|---|---|---|---|
| 17 | " | 4 sodium aluminate | 15 |

*N-grade sodium silicate - an aqueous commercial sodium silicate containing about 37.6 percent by weight sodium silicate and having a silica to sodium oxide ($SiO_2/Na_2O$) ratio of 3.22, marketed by Philadelphia Quartz Company.

**Solution also contains 500 parts per million Pusher 700, a high molecular weight partially hydrolyzed polyacrylamide wherein about 35 percent of the carboxyamide groups have been hydrolyzed to carboxyl groups marketed by The Dow Chemical Company.

These tests show that various gelling agents can be used to gel sodium silicate. Gellation occurs either immediately upon mixing the sodium silicate solution with the gelling agent solution or at some later time, depending on the concentration of sodium silicate and gelling agent employed.

EXAMPLE 18

In a waterflood operation in a California field, flood water quickly breaks through from an injection well to a production well indicating the existence of a severe high permeability channel between the two wells. It is desired to plug off this channel so that subsequently injected flood water will be diverted into other less permeable portions of the formation. The injection well is provided with a 6¼ inch diameter slotted liner over the interval from 3025 to 3444 feet and 2½ inch diameter tubing. The production well is shut in. The injection well is treated by sequentially injecting down the tubing and into the formation:
  a. 10 barrels fresh water as a breakdown fluid pumped at the rate of 3.5 barrels per minute and at a surface pressure of 0 pounds per square inch, gauge (psig),
  b. 5 barrels of an aqueous solution containing 7 percent by weight ammonium sulfate gelling agent and 0.6 percent by weight hydroxyethylcellulose mobility reducing agent,
  c. 2 barrels fresh water inert spacer,
  d. simultaneously:
    1. 12.5 barrels of an aqueous solution containing 7.5 percent by volume N-grade sodium silicate, and
    2. 12.5 barrels of an aqueous solution containing 3.6 percent by weight ammonium sulfate gelling agent, and
  e. 8 barrels fresh water inert spacer. The well is shut in for one hour. The injectivity of the well is determined to evaluate the effectiveness of the plug formed. Ten barrels fresh water are pumped into the well at the rate of 2 barrels per minute. The surface injection pressure is 100 psig. This indicates a plug has formed since the injection pressure is higher than before the treatment.

A second treatment is given the same well by sequentially injecting therein:
  a. 5 barrels of an aqueous solution containing 7 percent by weight ammonium sulfate gelling agent and 0.6 percent by weight hydroxyethylcellulose mobility reducing agent,
  b. 1.5 barrels fresh water inert spacer,
  c. simultaneously:
    1. 12.5 barrels of an aqueous solution containing 7.5 percent by volume N-grade sodium silicate, and
    2. 11.5 barrels of an aqueous solution containing 3.95 percent by weight ammonium sulfate gelling agent, and
  d. 18 barrels fresh water inert spacer. At the start of this injection, water is injected at a rate of 2 barrels per minute and at a pressure of 0 psig. The injection pressure increases until the last portion of the water is injected at a rate of 1 barrel per minute and at a pressure of 1020 psig. This sharp rise in injection pressure indicates the formation of a substantial plug in the formation.

While particular embodiments of the invention have been described, it will be understood that the invention is not limited thereto since many modifications can be made and it is intended to include within the invention any such embodiments as fall within the scope of the claims:

The invention having been thus described, I claim:

1. A method for reducing the permeability of the higher permeability strata or channels of a heterogeneous subterranean formation penetrated by a well comprising sequentially injecting the following fluids through the said well and into the said formation:
   a. about 1 to about 100 barrels per vertical foot of strata to be treated of an aqueous solution of a relatively high concentration of a gelling agent for alkali metal silicate;
   b. about 2 to about 200 barrels per vertical foot of strata to be treated of an aqueous solution of an alkali metal silicate and a relatively low concentration of a gelling agent for said alkali metal silicate; and
   c. about 1 to about 100 barrels per vertical foot of strata to be treated of an inert aqueous spacer liquid;
solutions (a) and (b) being injected in any order and solution (c) being injected between said solutions (a) and (b).

2. The method defined in claim 1 wherein said solution (a) is injected before said solution (b).

3. The method defined in claim 2 wherein said solution (a) also contains from about 0.001 to about 1 percent by weight of a water-soluble polymer mobility reducing agent.

4. The method defined in claim 1 wherein said solution (b) is injected before said solution (a).

5. The method defined in claim 4 wherein said solution (b) also contains from about 0.001 to about 1 percent by weight of a water-soluble polymer mobility reducing agent.

6. The method defined in claim 1 wherein said solution (a) contains from about 0.75 to about 1.4 parts by weight of said gelling agent per part of said alkali metal silicate in solution (b).

7. The method defined in claim 1 wherein said solution (b) contains from about 0.25 to about 0.75 parts by weight of said gelling agent per part of said alkali metal silicate.

8. The method defined in claim 1 wherein said solution (b) contains from about 0.75 to about 25 percent by weight of said alkali metal silicate.

9. The method defined in claim 1 wherein the gelling agents contained in said solutions (a) and (b) are selected from the group consisting of acids and acid-forming compounds, water-soluble ammonium salts, lower aliphatic aldehydes, aluminum salts and alkali metal aluminates.

10. The method defined in claim 9 wherein said gelling agents are ammonium sulfate.

11. The method defined in claim 1 wherein said alkali metal silicate is sodium silicate.

12. A method for at least partially plugging the higher permeability channels or strata of a heterogeneous subterranean formation penetrated by a well comprising sequentially injecting through the said well and into the said formation in the order named:
   a. about 1 to about 100 barrels per vertical foot of formation to be treated of an aqueous solution containing about 0.9 to about 1.25 parts by weight per part of the alkali metal silicate injected in step (c) of a gelling agent for said alkali metal silicate selected from the group consisting of acid and acid-forming compounds, water-soluble ammonium salts, lower aliphatic aldehydes, aluminum salts and alkali metal aluminates;
   b. about 1 to about 100 barrels per vertical foot of formation to be treated of an inert aqueous spacer liquid; and
   c. about 2 to about 200 barrels per vertical foot of formation to be treated of an aqueous solution containing from about 0.75 to about 25 percent by weight of an alkali metal silicate and from about 0.5 to about 1 part by weight per part of said alkali metal silicate of a gelling agent for said alkali metal silicate selected from the group consisting of acid and acid-forming compounds, water-soluble ammonium salts, lower aldehydes, aluminum salts and alkali metal aluminates.

13. The method defined in claim 12 wherein said gelling agent is ammonium sulfate.

14. The method defined in claim 12 wherein said alkali metal silicate is sodium silicate.

15. The method defined in claim 12 wherein said solution injected in step (a) also contains from about 0.001 to about 1 percent by weight of a water-soluble polymer mobility reducing agent.

* * * * *